F. M. DANNENFELSER.
MEASURING INSTRUMENT OR TOOL.
APPLICATION FILED MAR. 20, 1915.

1,166,512.

Patented Jan. 4, 1916.
2 SHEETS—SHEET 1.

Witnesses:

Inventor
F. M. Dannenfelser

F. M. DANNENFELSER.
MEASURING INSTRUMENT OR TOOL.
APPLICATION FILED MAR. 20, 1915.

1,166,512.

Patented Jan. 4, 1916.
2 SHEETS—SHEET 2.

Witnesses:

Inventor
F. M. Dannenfelser

UNITED STATES PATENT OFFICE.

FREDERICK M. DANNENFELSER, OF MUSKEGON, MICHIGAN.

MEASURING INSTRUMENT OR TOOL.

1,166,512.  Specification of Letters Patent.  Patented Jan. 4, 1916.

Application filed March 20, 1915. Serial No. 15,699.

*To all whom it may concern:*

Be it known that I, FREDERICK M. DANNENFELSER, a citizen of the United States, residing at Muskegon, county of Muskegon, Michigan, have invented certain new and useful Improvements in Measuring Instruments or Tools, of which the following is a full, clear, and exact description.

My invention relates to tools or instruments for assisting sheet metal workers in laying out patterns, and has for its object to provide a means for doing mechanically much of the work which heretofore has required graphic solution by the method known as triangulation.

Figure 1:
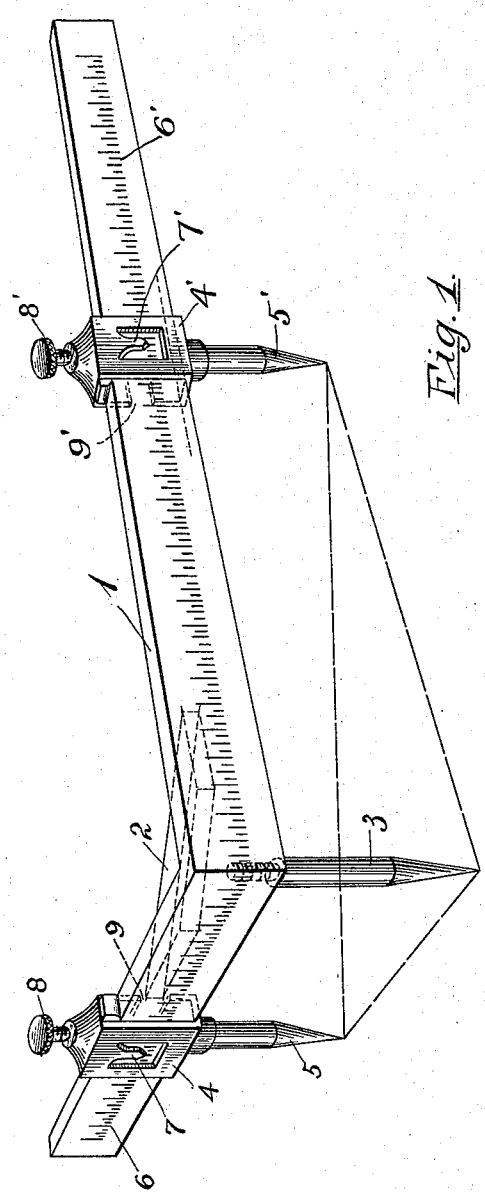
Figure 2:
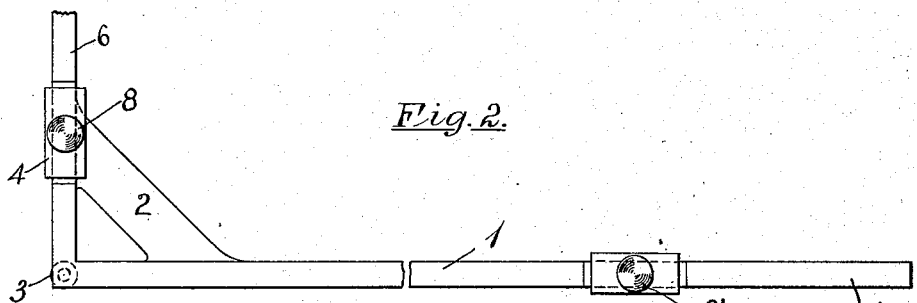
Figure 3:
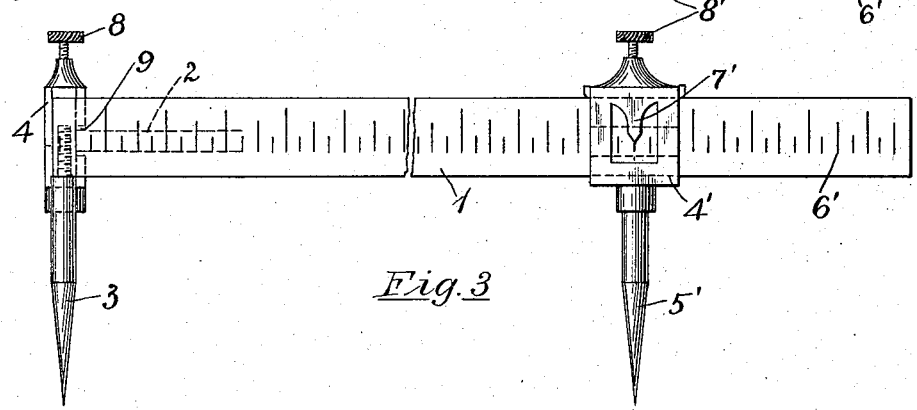
Figure 4:
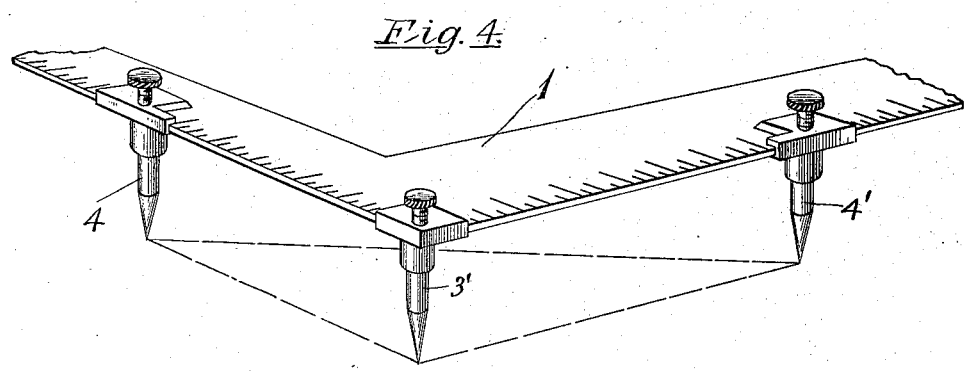

The following is a description of an embodiment of my invention, reference being had to the accompanying drawings, in which, Figure 1 shows the instrument in perspective. Fig. 2 shows a plan view of the instrument. Fig. 3 shows a front elevation of the same. Fig. 4 shows a perspective of a modification.

Referring more particularly to the drawings, 1 is a wrought iron bar having two arms provided with extended flat surfaces at right angles to one another.

2 is an angle brace for stiffening the angle and keeping the arms in right angle relation, 3 is a pin secured to the bar at the vertex of the right angle portion.

4—4' are two trammels having pins or points 5—5' so located that the angle between lines connecting the points of the pin 3 and the points of the pins 5—5' is always a right angle. The arms are provided with graduations 6—6' and the trammels are provided with index points 7—7' in line with their points 5—5'.

8—8' are set screws for securing the trammels at any points to which it may be moved. The inner faces of the trammel frames are provided with slots 9—9' in line with the brace 2 so that the trammels can be moved close to the angular portion.

In the modification 1 is a carpenter's steel square, 3' is a pin provided with a clamp so that it can be clamped to the square at the right angle, 4—4' are pins provided with clamps that can be secured at any desired points along the arms of the square, the points of the pins being as before, always at the vertices of the right angle triangle.

In using this tool one of the trammels is set at a given distance from the center pin—the other trammel is likewise set at a given distance from the center pin, the distance between the two two trammel pins then giving the desired distance between two points on the pattern, providing a direct means for laying out patterns by triangulation. The points or pins project at right angles to the plane in which the axes of the two arms lie.

It will be evident to those skilled in the art that various modifications can be made of an embodiment of my invention without departing from the spirit thereof or the scope of the appended claims.

What I claim is:

1. In an instrument, the combination of two arms at right angles to one another, a point adjacent to the junction of said arms and projecting at right angles from the plane common to said arms and two movable points, one on each arm also projecting at right angles from said plane, so related that the lines connecting the point at the junction of the two arms with the other two points always form a right angle.

2. In an instrument, the combination of two arms at right angles to one another, a point fixed in a position adjacent to the junction of said arms and projecting at right angles from the plane common to said arms and two movable points, one on each arm also projecting at right angles from said plane, so related that the lines connecting the point at the junction of the two arms with the other two points always form a right angle, said arms being provided with graduation marks.

3. In an instrument, the combination of two arms at right angles to one another, a point fixed adjacent to the junction of said arms and projecting at right angles from the plane common to said arms and two movable points, one on each arm also projecting at right angles from said plane, so related that the lines connecting the point at the junction of the two arms with the other two points always form a right angle, and an angle brace at the junction of the two arms connecting the extended flat sides thereof.

FREDERICK M. DANNENFELSER.

Witnesses:
WM. CARPENTER,
EDA M. OCHS.

Copies of this patent may be obtained for five cents each, by addressing the "Commissioner of Patents, Washington, D. C."